US012562427B2

(12) United States Patent
Sato et al.

(10) Patent No.: US 12,562,427 B2
(45) Date of Patent: Feb. 24, 2026

(54) BATTERY WIRING MODULE

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 779 days.

(21) Appl. No.: 17/924,072

(22) PCT Filed: May 18, 2021

(86) PCT No.: PCT/JP2021/018754
§ 371 (c)(1),
(2) Date: Nov. 8, 2022

(87) PCT Pub. No.: WO2021/241321
PCT Pub. Date: Dec. 2, 2021

(65) Prior Publication Data
US 2023/0178839 A1 Jun. 8, 2023

(30) Foreign Application Priority Data
May 25, 2020 (JP) ................................. 2020-090488

(51) Int. Cl.
*H01M 50/298* (2021.01)

(52) U.S. Cl.
CPC ................................. *H01M 50/298* (2021.01)

(58) Field of Classification Search
CPC . Y02E 60/10; H01M 2220/20; H01M 50/298; H01M 50/209; H01M 50/507; H01M 50/569; H01M 50/572
See application file for complete search history.

(56) References Cited

U.S. PATENT DOCUMENTS

2014/0349165 A1 11/2014 Ogasawara et al.
2019/0221787 A1 7/2019 Yanagida et al.

FOREIGN PATENT DOCUMENTS

JP H10-080041 A 3/1998
JP 2012-164598 A 8/2012
(Continued)

OTHER PUBLICATIONS

English Translation of JP2012243608.*
International Search Report issued on Aug. 3, 2021 for WO 2021/241321 A1 (4 pages).

*Primary Examiner* — Kiran Quraishi Akhtar
(74) *Attorney, Agent, or Firm* — Venjuris, P.C.

(57) ABSTRACT

A first cover includes: a cover body portion that covers a wire insertion portion, a first engaging portion that extends from the cover body portion to a case body side, and is engaged with a first engagement portion of the case body, and a second engaging portion that extends from the cover body portion to the case body, and is engaged with a second engagement portion of the case body. A length in an extending direction of the first engaging portion is set longer than a length in an extending direction of the second engaging portion. Moreover, the case body includes a first regulation portion that abuts against a leading end portion in the extending direction of the first engaging portion when the first engaging portion is about to be engaged with the second engagement portion, and regulates displacement of the first engaging portion in an attachment direction.

2 Claims, 5 Drawing Sheets

(56)     References Cited

FOREIGN PATENT DOCUMENTS

| JP | 2012-243608 | A | 12/2012 | | |
|----|----|----|----|----|----|
| JP | 2012243608 | * | 12/2012 | .............. | H01M 2/10 |
| JP | 2013-178969 | A | 9/2013 | | |

* cited by examiner

BATTERY WIRING MODULE

CROSS REFERENCE TO RELATED APPLICATIONS

This application is a national phase of PCT application No. PCT/JP2021/018754, filed on 18 May 2021, which claims priority from Japanese patent application No. 2020-090488, filed on 25 May 2020, all of which are incorporated herein by reference.

TECHNICAL FIELD

The present disclosure relates to a battery wiring module.

BACKGROUND

As disclosed in Patent Document 1, for example, in a vehicle such as an electric automobile or a hybrid automobile, a battery wiring module is mounted to a high-voltage secondary battery that is mounted as a travelling drive power source. The battery wiring module in Patent Document 1 includes an electric wire that is electrically connected to the secondary battery, and a case that houses the electric wire. The case of the battery wiring module includes a case body that has a wire insertion portion through which the electric wire is passed, and a cover that covers the wire insertion portion. The cover of the battery wiring module of Patent Document 1 is formed separately from the case body. The cover includes engaging portions that are respectively engaged with a plurality of engagement portions provided on the case body, in a direction that lies along the opening direction of the wire insertion portion. As a result of the engaging portions of the cover being engaged with the engagement portions of the case body, the cover is attached to the case body.

PRIOR ART DOCUMENT

Patent Document

Patent Document 1: JP 2014-229594 A

SUMMARY OF THE INVENTION

Problems to be Solved

Regarding a case of a battery wiring module such as that described above, as a result of a plurality of engaging portions of a cover being respectively engaged with a plurality of corresponding engagement portions of a case body in a proper manner, the cover is attached to the case body in a proper orientation at a proper position. However, if the engaging portions of the cover can be engaged with engagement portions that are not proper engagement portions, there is a risk that the cover will be attached in an improper orientation at an improper position.

In view of this, an object of the present disclosure is to provide a battery wiring module that can suppress erroneous attachment of a cover.

Means to Solve the Problem

A battery wiring module according to the present disclosure is a battery wiring module to be attached to a secondary battery, including: an electric wire to be electrically connected to the secondary battery, and a case that houses the electric wire, the case including: a case body that has a wire insertion portion through which the electric wire is passed, and a cover that covers the wire insertion portion, the cover being formed separately from the case body, the case body including a first engagement portion and a second engagement portion, the cover including a cover body portion that covers the wire insertion portion, a first engaging portion that extends from the cover body portion to the case body side, and is engaged with the first engagement portion, and a second engaging portion that extends from the cover body portion to the case body side, and is engaged with the second engagement portion, a length in an extending direction of the first engaging portion being set longer than a length in an extending direction of the second engaging portion, and the case body including a regulation portion that abuts against a leading end portion in the extending direction of the first engaging portion when the first engaging portion is about to be engaged with the second engagement portion, and regulates displacement of the first engaging portion in an attachment direction.

Effect of the Invention

According to the present disclosure, it is possible to provide a battery wiring module that can suppress erroneous attachment of a cover.

DETAILED DESCRIPTION TO EXECUTE THE INVENTION

Description of Embodiments of Present Disclosure

Figure 1:
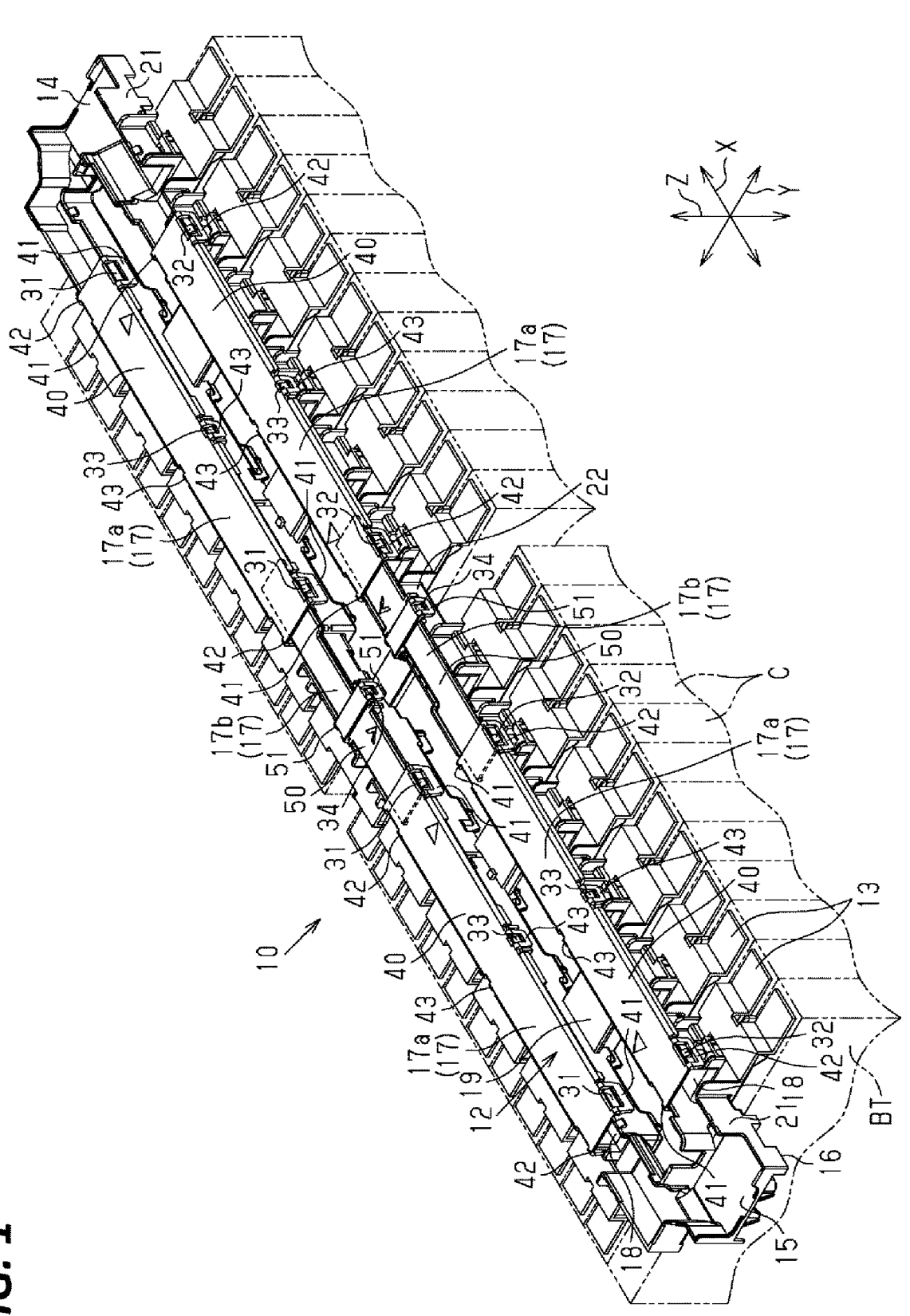
FIG. 1 is a perspective view of a battery wiring module according to an embodiment of the present disclosure.

Firstly, embodiments of the present disclosure will be listed and described.

A battery wiring module according to the present disclosure is:

[1] a battery wiring module to be attached to a secondary battery, including: an electric wire to be electrically connected to the secondary battery, and a case that houses the electric wire, the case including: a case body that has a wire insertion portion through which the electric wire is passed, and a cover that covers the wire insertion portion, the cover being formed separately from the case body, the case body including a first engagement portion and a second engagement portion, the cover including a cover body portion that covers the wire insertion portion, a first engaging portion that extends from the cover body portion to the case body side, and is engaged with the first engagement portion, and a second engaging portion that extends from the cover body portion to the case body side, and is engaged with the second engagement portion, a length in an extending direction of the first engaging portion being set longer than a length in an extending direction of the second engaging portion, and the case body including a regulation portion that abuts against a leading end portion in the extending direction of the first engaging portion when the first engaging portion is about to be engaged with the second engagement portion, and regulates displacement of the first engaging portion in an attachment direction.

With this configuration, when the first engaging portion of the cover is about to be mistakenly engaged with the second engagement portion of the case body, the leading end portion of the first engaging portion abuts against the regulation portion of the case body, making it possible to avoid engagement of the first engaging portion with the second engagement portion. Accordingly, it is possible to suppress erroneous attachment of the cover. In addition, the regulation portion is configured to be capable of abutting against the first engaging portion itself. Therefore, there is no need to separately set, on the cover, a section for avoiding engagement between the first engaging portion and the second engagement portion, and, as a result, it is possible to simplify the shape of the cover.

[2] The case body includes a third engagement portion, the cover includes a third engaging portion that extends from the cover body portion to the case body side, and is engaged with the third engagement portion, the length of the first engaging portion is set longer than a length of the third engaging portion in a direction that lies along an insertion direction of the electric wire, with the regulation portion being defined as a first regulation portion, the case body includes a second regulation portion on a lateral side of the third engagement portion in a direction that lies along the insertion direction of the electric wire, and, when the first engaging portion is about to be engaged with the third engagement portion, the second regulation portion abuts against the first engaging portion, and regulates displacement of the first engaging portion in the attachment direction.

With this configuration, when the first engaging portion of the cover is about to be erroneously engaged with the third engagement portion of the case body, the first engaging portion abuts against the second regulation portion of the case body, making it possible to avoid engagement of the first engaging portion with the third engagement portion. Accordingly, it is possible to further suppress erroneous attachment of the cover. In addition, the second regulation portion is configured to be capable of abutting against the first engaging portion itself. Therefore, there is no need to separately set, on the cover, a section for avoiding engagement between the first engaging portion and the third engagement portion, and as a result, it is possible to simplify the shape of the cover.

[3] The wire insertion portion includes a bottom wall portion and a pair of side wall portions extending from the bottom wall portion, a slit is provided in the side wall portions, and the cover includes a protrusion portion fitted into the slit.

With this configuration, a configuration can be adopted in which the protrusion portion of the cover abuts against the side wall portion of the case body when the cover is attached at an improper position in an improper orientation, and, as a result, it is possible to suppress erroneous attachment of the cover.

Detailed Description of Embodiments of Present Disclosure

Specific examples of a battery wiring module according to the present disclosure will be described below with reference to the drawings. In the drawings, some of the components may be shown exaggerated or simplified for the sake of convenience of description. In addition, the dimensional ratios of the components may be different in each of the drawings. Note that the present invention is not limited to these examples, and is defined by the claims, and all changes that come within the meaning and range of equivalency of the claims are intended to be embraced therein.

As shown in FIG. 1, a battery wiring module 10 according to an embodiment of the present disclosure is attached to a secondary battery BT that is mounted in an electric automobile, a hybrid automobile, or the like. The secondary battery BT supplies power to a travelling motor (not illustrated) of the vehicle. Also, the secondary battery BT is supplied with power from the travelling motor or a power generation motor in accordance with a charge state and a driving state of the vehicle.

The secondary battery BT includes a plurality of battery cells C. The secondary battery BT has a substantially rectangular parallelepiped shape as a result of the plurality of battery cells C being aligned in one direction, for example. The battery wiring module 10 is mounted on one side surface of the secondary battery BT. Note that the following description will be given assuming that the surface of the secondary battery BT on which the battery wiring module 10 is mounted is the upper surface of the secondary battery BT, and the battery wiring module 10 side of the secondary battery BT is upward. In addition, an X axis from among XYZ axes in the drawings that are orthogonal to one another represents the longitudinal direction X of a case 12 of the battery wiring module 10, the Y axis represents the width direction Y of the case 12, and the Z axis represents the height direction Z of the case 12. The battery cells C are provided in parallel along the longitudinal direction X of the battery wiring module 10.

Figure 2:
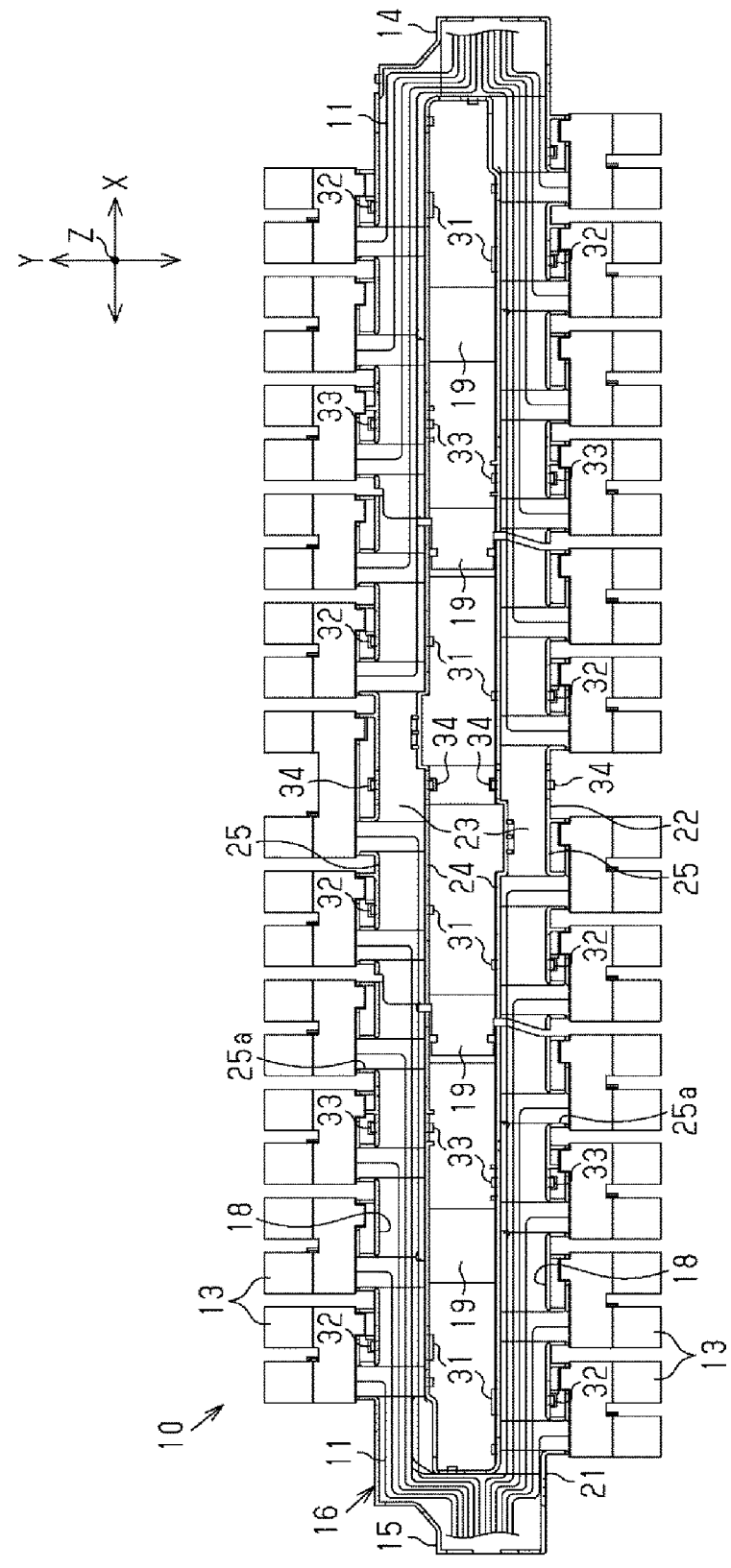
FIG. 2 is a plan view showing the battery wiring module according to the embodiment in a state where covers are removed.

As shown in FIGS. 1 and 2, the battery wiring module 10 includes a plurality of electric wires 11 that are electrically connected to the secondary battery BT, and the case 12 that houses the electric wires 11. Note that the electric wires 11 are not illustrated in FIG. 1.

Also, the battery wiring module 10 according to the present embodiment includes a plurality of busbars 13 supported by the case 12, for example. The plurality of busbars 13 are aligned on each of the two sides in the width direction Y of the case 12, along the longitudinal direction X of the case 12, for example. A positive electrode terminal and a negative electrode terminal (not illustrated) provided on the upper surface of each battery cell C are connected to the busbar 13.

As shown in FIG. 2, the busbars 13 are electrically connected to the corresponding electric wires 11, respectively. The electric wires 11 are inserted into the case 12 along the longitudinal direction X. Some of the plurality of electric wires 11 are led to the outside of the case 12 from a first wire lead-out portion 14 provided in one end portion in the longitudinal direction X of the case 12, and the plurality of remaining electric wires 11 are lead to the outside of the case 12 from a second wire lead-out portion 15 provided in the other end portion in the longitudinal direction X of the case 12.

Case 12

As shown in FIG. 1, the case 12 includes a case body 16 and a cover 17. The case body 16 includes a wire insertion portion 18 through which electric wires 11 are passed. The wire insertion portion 18 has a shape of a groove that is open upward in the height direction Z. In addition, the wire insertion portion 18 extends along the longitudinal direction X of the case 12. Note that, in the case body 16 according to the present embodiment, two wire insertion portions 18 are aligned in the width direction Y, for example. In addition, the case body 16 includes a plurality of coupling portions 19 that couple the two wire insertion portions 18 to each other. The cover 17 covers the upper side of the wire insertion portions 18. The number of covers 17 according to the present embodiment that are provided is two in correspondence with the two wire insertion portions 18. In addition, the covers 17 are formed separately from the case body 16. Note that the case body 16 and the covers 17 are each formed of a synthetic resin, for example.

Case Body 16

As shown in FIGS. 1 and 2, a configuration is adopted in which the case body 16 is divided into a plurality of pieces in the longitudinal direction X of the case 12, for example. Note that FIG. 2 is a plan view of the battery wiring module 10 in a state where the covers 17 are removed. The case body 16 according to the present embodiment is divided into three in the longitudinal direction X of the case 12. Specifically, the case body 16 includes a pair of first case bodies 21 and a second case body 22 disposed between the pair of first case bodies 21. The pair of first case bodies 21 and the second case body 22 are provided in parallel in the longitudinal direction X of the case 12.

As shown in FIG. 2, each of the wire insertion portions 18 includes a bottom wall portion 23 and a pair of side wall portions 24 and 25 that extend upward from the bottom wall portion 23. The pair of side wall portions 24 and 25 oppose each other in the width direction Y of the case 12. In addition, in the wire insertion portion 18, one wall portion, namely the side wall portion 24 is positioned on the inner side in the width direction Y relative to the other wall portion, namely the side wall portion 25. The wire insertion portion 18 has a shape of a groove that is open upward in the height direction Z, due to the bottom wall portion 23 and the side wall portions 24 and 25. In the wire insertion portion 18, electric wires 11 are inserted between the pair of side wall portions 24 and 25. Note that the bottom wall portion 23 and the pair of side wall portions 24 and 25 are formed in each of the first case bodies 21 and the second case body 22.

Moreover, the wire insertion portion 18 includes first to fourth engagement portions 31 to 34. The engagement portions 31 to 34 protrude outward in the width direction Y from the outer surfaces of the side wall portions 24 and 25, for example.

In the present embodiment, a plurality of first engagement portions 31 are provided on the side wall portions 24 positioned on the inner side in the width direction Y of the wire insertion portion 18. In addition, a plurality of third engagement portions 33 and one fourth engagement portion 34 are provided on the side wall portions 24. Specifically, for example, one first engagement portion 31 and one third engagement portion 33 are provided on the side wall portion 24 of each first case body 21. In addition, a fourth engagement portion 34 and two first engagement portions 31 are provided on the side wall portion 24 of the second case body 22.

A plurality of second engagement portions 32 are provided on the side wall portions 25 positioned on the outer side in the width direction Y, in the wire insertion portion 18. In addition, a plurality of third engagement portions 33 and one fourth engagement portion 34 are provided on the same side wall portions 25. Specifically, for example, one second engagement portion 32 and one third engagement portion 33 are provided on the side wall portion 25 of each first case body 21. In addition, a fourth engagement portion 34 and two second engagement portions 32 are provided on each of the side wall portions 25 of the second case body 22.

Covers 17

As shown in FIG. 1, each cover 17 of the pair of covers 17 that respectively cover the pair of wire insertion portions 18 includes a plurality of first covers 17a and a second cover 17b, for example. Each of the covers 17 according to the present embodiment includes a pair of first covers 17a, and a second cover 17b provided between the pair of first covers 17a in the longitudinal direction X. Accordingly, the entire case 12 includes four first covers 17a and two second covers 17b. The first covers 17a have the same shape. Also, the two second covers 17b have the same shape. In addition, the first covers 17a and the second cover 17b are formed separately from each other.

Figure 3:
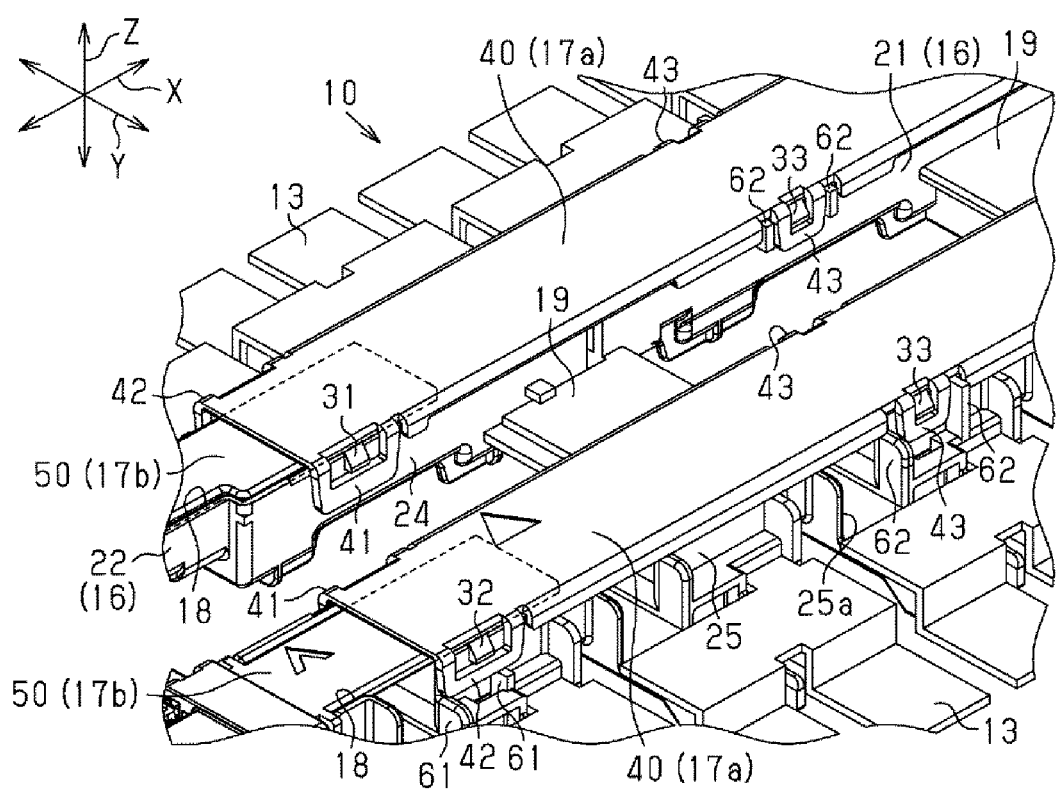
FIG. 3 is an enlarged perspective view of a portion of the battery wiring module according to the embodiment.

As shown in FIGS. 1 and 3, each first cover 17a includes a cover body portion 40 that covers the upper side of the wire insertion portion 18. The cover body portion 40 has an elongated shape that extends along the longitudinal direction X of the case 12, for example. In addition, the first cover 17a includes a first engaging portion 41 that is engaged with the first engagement portion 31, a second engaging portion 42 that is engaged with the second engagement portion 32, and a third engaging portion 43 that is engaged with the third engagement portion 33. The first to third engaging portions 41 to 43 extend from the cover body portion 40 to the case body 16 side in the height direction Z, in other words, downward.

In each first cover 17a, first engaging portions 41 are formed respectively in the two end portions in the longitudinal direction X, on an edge portion of the cover body portion 40 on the inner side in the width direction Y. Also, in the cover body portion 40, second engaging portions 42 are formed respectively in the two end portions in the longitudinal direction X, on an edge portion of the cover body portion 40 on the outer side in the width direction Y. Accordingly, in the two end portions in the longitudinal direction X of the cover body portion 40, the first engaging portion 41 and the second engaging portion 42 oppose each other in the width direction Y. Moreover, one third engaging portion 43 is formed on two edge portions of the cover body portion 40 in the width direction Y, in intermediate portions in the longitudinal direction X of the cover body portion 40, for example. The first to third engaging portions 41 to 43 are respectively engaged with the first to third engagement portions 31 to 33 in a direction that lies along the opening direction of the wire insertion portion 18, in other words, the height direction Z. Accordingly, the first cover 17a is attached to the wire insertion portion 18.

Note that, in each of the first covers 17a, the first engaging portion 41 that engages with the first engagement portion 31 of the second case body 22 is configured to be movable relative to this first engagement portion 31 in the longitudinal direction X. Specifically, a gap is set between this first engaging portion 41 and the first engagement portion 31 of the second case body 22 in the longitudinal direction X of the case 12. Similarly, in the first cover 17*a*, the second engaging portion 42 that engages with the second engagement portion 32 of the second case body 22 is configured to be movable relative to this second engagement portion 32 in the longitudinal direction X. Specifically, a gap is set between this second engaging portion 42 and the second engagement portion 32 of the second case body 22 in the longitudinal direction X of the case 12. Accordingly, for example, when the secondary battery BT thermally expands, each first case body 21 and the second case body 22 are allowed to move relative to each other in the longitudinal direction X.

Figure 4:
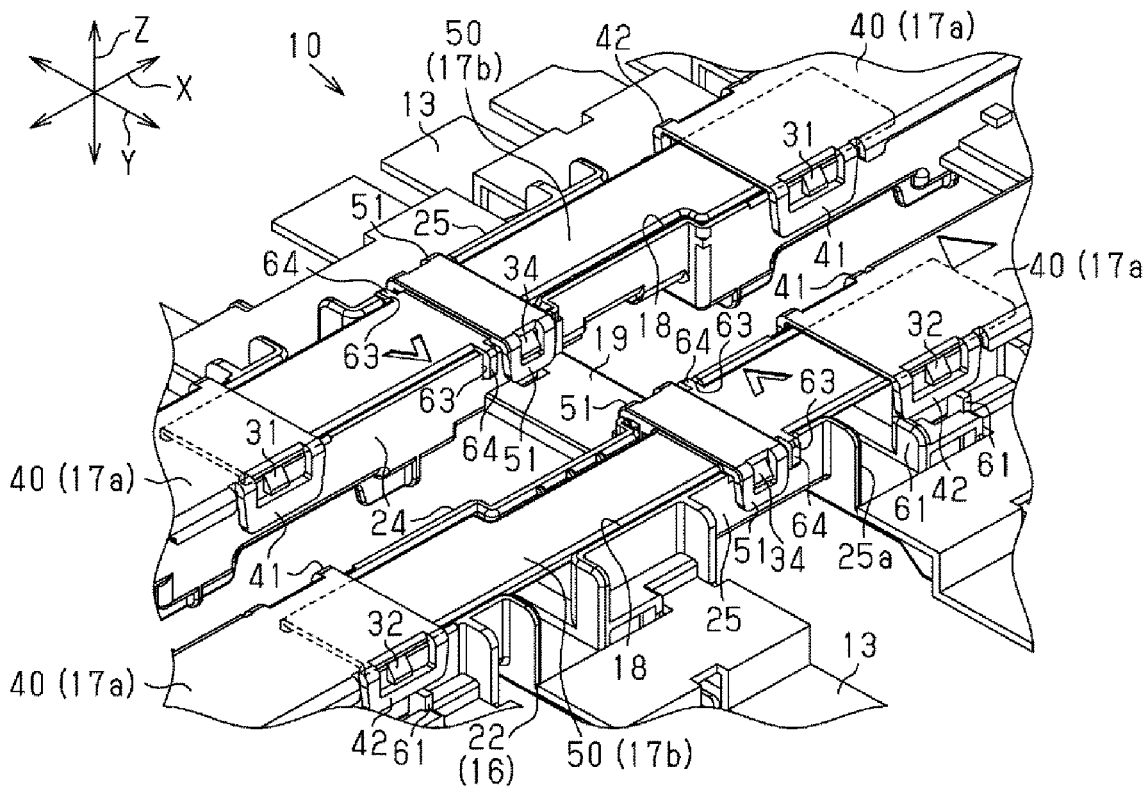
FIG. 4 is an enlarged perspective view of a portion of the battery wiring module according to the embodiment.

As shown in FIGS. 1 and 4, each second cover 17*b* includes a cover body portion 50 that covers the upper side of the wire insertion portion 18, and a fourth engaging portion 51 that engages with the fourth engagement portion 34 of the wire insertion portion 18. The cover body portion 50 has an elongated shape that extends along the longitudinal direction X of the case 12, for example. The fourth engaging portion 51 extends from the cover body portion 50 to the case body 16 side in the height direction Z, in other words, downward. In addition, one fourth engaging portion 51 is formed on two edge portions in the width direction Y of the cover body portion 50, in intermediate portions in the longitudinal direction X of the cover body portion 50, for example. The fourth engaging portions 51 are engaged with the fourth engagement portions 34 in a direction that lies along the opening direction of the wire insertion portions 18, in other words, the height direction Z. Accordingly, the second cover 17*b* is attached to the wire insertion portion 18.

Figure 5:
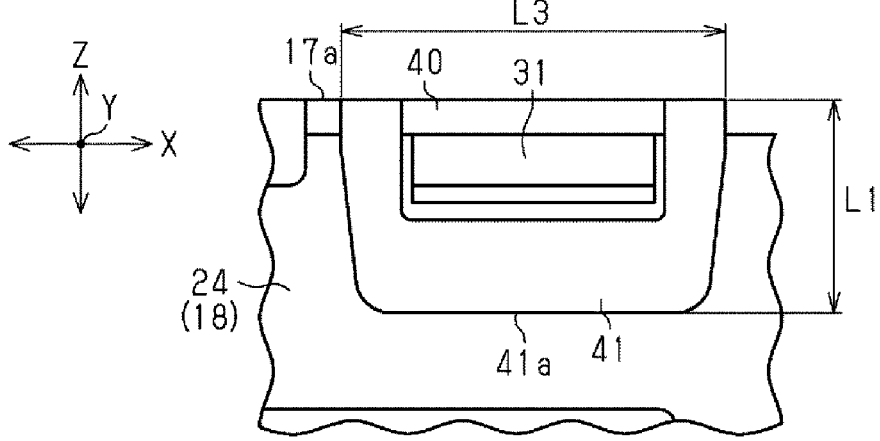
FIG. 5 is a side view showing a configuration of a first engaging portion, a first engagement portion, and the surroundings thereof, in the battery wiring module according to the embodiment.
Figure 6:
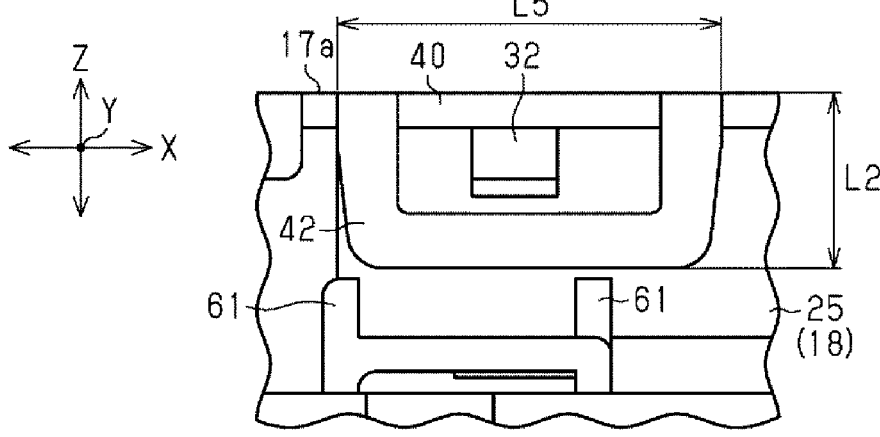
FIG. 6 is a side view showing a configuration of a second engaging portion, a second engagement portion, and the surroundings thereof, in the battery wiring module according to the embodiment.

Here, as shown in FIGS. 5 and 6, a length L1 of each first engaging portion 41 in the extending direction thereof, in other words, the height direction Z is set longer than a length L2 of each second engaging portion 42 in the extending direction thereof, in other words, the height direction Z. Accordingly, a leading end portion 41*a*, namely, a lower end portion in the extending direction of the first engaging portion 41 is positioned below a lower end portion of the second engaging portion 42. Note that, for example, the lengths L1 of the first engaging portions 41 that are provided on the covers 17 are the same. Also, for example, the lengths L2 of the second engaging portion 42 that are provided on the covers 17 are the same.

As shown in FIGS. 4 and 6, on the side wall portions 25 positioned on the outer side in the width direction Y of the wire insertion portions 18, first regulation portions 61 are provided near below the second engagement portions 32 with which the second engaging portions 42 are engaged. The first regulation portions 61 protrude from the outer surfaces of the side wall portions 25 in the width direction Y.

The first regulation portions 61 are configured to not abut against the second engaging portions 42 in the height direction Z in a state where the second engaging portions 42 are engaged with the second engagement portions 32. On the other hand, when the first engaging portions 41 are attached to the second engagement portions 32 downward in the height direction Z in an attempt to engage the first engaging portions 41 with the second engagement portions 32, the leading end portions 41*a* of the first engaging portions 41 abut against the first regulation portions 61 before the first engaging portions 41 are engaged with the second engagement portions 32, and further displacement of the first engaging portions 41 is regulated by the first regulation portions 61. Note that the first regulation portions 61 also serve as reinforcing ribs for reinforcing the side wall portion 25, in order to suppress tilting of the side wall portion 25 in the width direction Y.

Figure 7:
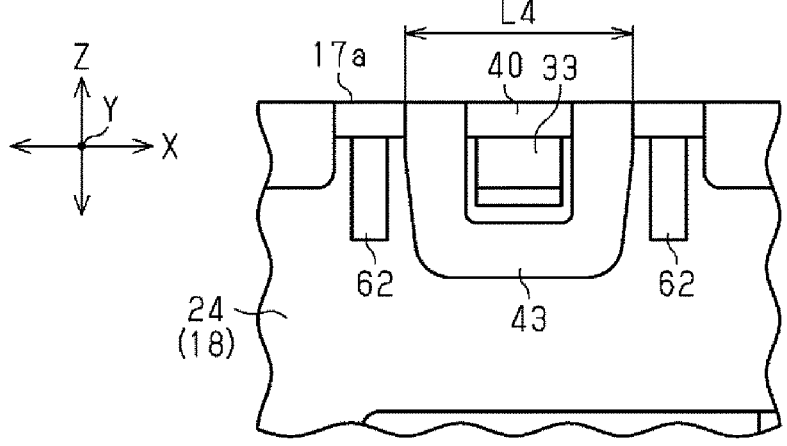
FIG. 7 is a side view showing a configuration of a third engaging portion, a third engagement portion, and the surroundings thereof, in the battery wiring module according to the embodiment.

As shown in FIGS. 5 and 7, a length L3 of each first engaging portion 41 in the longitudinal direction X of the case 12 is set longer than a length L4 of each third engaging portion 43 in the longitudinal direction X. Note that, for example, the lengths L3 of the first engaging portions 41 that are provided in the covers 17 are the same. Also, for example, the lengths L4 of the third engaging portions 43 that are provided in the covers 17 are the same.

As shown in FIG. 3, on the side wall portions 24 and 25 of the wire insertion portions 18, second regulation portions 62 are respectively provided on the two sides of each of the third engaging portions 43 in the longitudinal direction X of the case 12. The second regulation portions 62 protrude from the outer surfaces of the side wall portions 24 and 25 in the width direction Y. Note that FIG. 7 illustrates the second regulation portions 62 provided near the third engagement portion 33 of a side wall portion 24.

As shown in FIGS. 3 and 7, the second regulation portions 62 are disposed at positions at which they do not abut against the third engaging portions 43 in the longitudinal direction X of the case 12 in a state where the third engaging portions 43 are engaged with the third engagement portions 33. On the other hand, when a first engaging portion 41 is attached to a third engagement portion 33 downward in the height direction Z in an attempt to engage the first engaging portion 41 with the third engagement portion 33, the first engaging portion 41 abuts against the second regulation portions 62 before the first engaging portion 41 is engaged with the third engagement portion 33, and further displacement of the first engaging portion 41 is regulated by the second regulation portions 62.

Note that, as shown in FIGS. 6 and 7, a length L5 of each second engaging portion 42 in the longitudinal direction X of the case 12 is set longer than the length L4 of each third engaging portion 43 in the longitudinal direction X. Accordingly, when the second engaging portion 42 is attached to the third engagement portion 33 downward in the height direction Z in an attempt to engage the second engaging portion 42 with the third engagement portion 33, the second engaging portion 42 abuts against the second regulation portions 62 before the second engaging portion 42 is engaged with the third engagement portion 33, and further displacement of the second engaging portion 42 is regulated by the second regulation portions 62.

Moreover, the second regulation portions 62 in each wire insertion portion 18 that are provided on the side wall portions 25 provided on the outer side in the width direction Y also serve as reinforcing ribs for reinforcing the side wall portions 25, in order to suppress tilting of the side wall portion 25 in the width direction Y. The side wall portions 25 includes, at positions corresponding to the busbars 13, openings 25*a* through which an electric wire 11 is passed to the busbar 13 side, and thus it is difficult to ensure the rigidity of the side wall portions 25. In view of this, the second regulation portions 62 and the first regulation portions 61 that are provided on the side wall portions 25 serving as reinforcing ribs is suitable in terms of securing the rigidity of the side wall portions 25.

Figure 8:
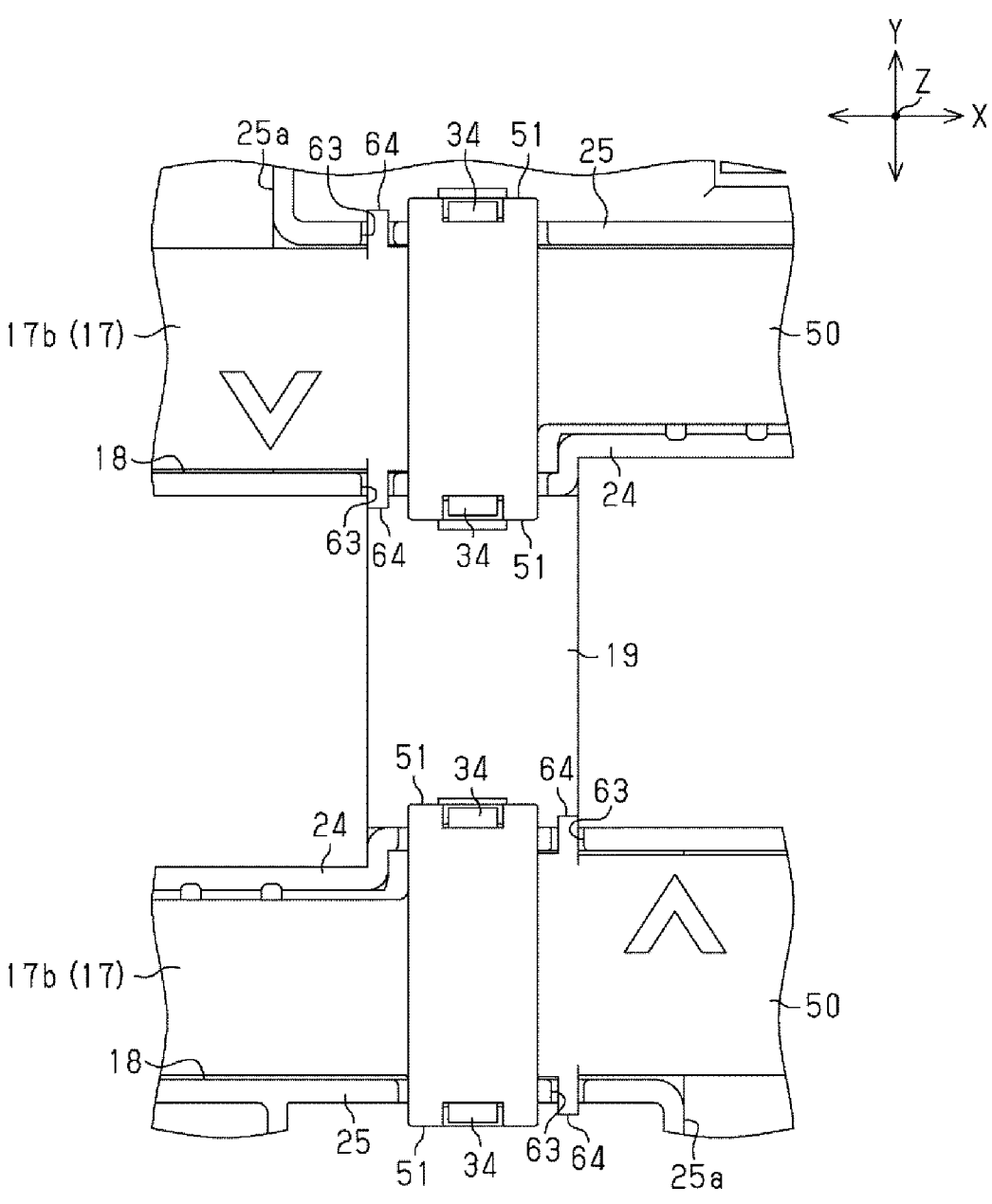
FIG. 8 is an enlarged plan view of a portion of the battery wiring module according to the embodiment.

As shown in FIGS. 4 and 8, in the side wall portions 24 and 25 of the wire insertion portions 18, a slit 63 is provided on one side of each fourth engagement portion 34 in the longitudinal direction X of the case 12. The slits 63 are formed so as to extend from upper end portions of the side wall portions 24 and 25 in the height direction Z. Note that, in the present embodiment, the slits 63 are provided in the second case body 22.

On the other hand, each second cover 17b includes protrusion portions 64 at positions near the fourth engaging portions 51. The protrusion portions 64 extend from the cover body portion 50 in the same direction as the fourth engaging portions 51, in other words, downward. In addition, one protrusion portion 64 is formed, for example, in each of two edge portions in the width direction Y of cover body portion 50. As a result of the second cover 17b being attached to the wire insertion portion 18 in a proper attachment orientation, the protrusion portions 64 are fitted into the slits 63. In addition, if the second cover 17b is not in the proper attachment orientation, the protrusion portions 64 interfere with upper end portions of the side wall portions 24 and 25.

Effects of the present embodiment will be described.

(1) The case body 16 includes the first regulation portions 61 that abut against the leading end portions 41a in the extending direction of the first engaging portions 41 when the first engaging portions 41 are about to be engaged with the second engagement portions 32, and regulate displacement of the first engaging portions 41 in the attachment direction. With this configuration, when the first engaging portions 41 of each first cover 17a are about to be erroneously engaged with the second engagement portions 32 of the case body 16, the leading end portions 41a of the first engaging portions 41 abut against the first regulation portions 61 of the case body 16, thereby making it possible to avoid engagement of the first engaging portions 41 with the second engagement portions 32. Accordingly, it is possible to suppress erroneous attachment of the first cover 17a. In addition, the first regulation portions 61 are configured to be capable of abutting against the first engaging portions 41 themselves. Therefore, there is no need to separately set, on the cover, a section for avoiding engagement between the first engaging portions 41 and the second engagement portions 32, and, as a result, it is possible to simplify the shape of the first cover 17a.

(2) Each first cover 17a includes third engaging portions 43 that extend from the cover body portion 40 to the case body 16 side, and are engaged with the third engagement portions 33 of the case body 16. The length L3 of each first engaging portion 41 is set longer than the length L4 of each third engaging portion 43, in a direction that lies along the insertion direction of electric wires 11, in other words, the longitudinal direction X of the case 12. The case body 16 includes the second regulation portions 62 on the lateral sides of the third engagement portions 33 in the longitudinal direction X of the case 12. When a first engaging portion 41 is about to be engaged with a third engagement portion 33, the second regulation portions 62 abut against the first engaging portion 41, and regulate displacement of the first engaging portion 41 in the attachment direction. With this configuration, when a first engaging portion 41 of the cover is about to be erroneously engaged with a third engagement portion 33 of the case body 16, the first engaging portion 41 abuts against the second regulation portions 62 of the case body 16, and thereby it is possible to avoid engagement of the first engaging portion 41 with the third engagement portion 33. Accordingly, it is possible to further suppress erroneous attachment of the first cover 17a. In addition, the second regulation portions 62 are configured to be capable of abutting against a first engaging portion 41 itself. Therefore, there is no need to separately set, on the cover, a section for avoiding engagement between a first engaging portion 41 and a third engagement portion 33, and, as a result, it is possible to simplify the shape of the first cover 17a.

(3) Each wire insertion portion 18 includes the bottom wall portions 23, and the pairs of side wall portions 24 and 25 extending from the bottom wall portions 23. Moreover, the slits 63 are provided in the side wall portions 24 and 25, and the second cover 17b includes the protrusion portions 64 fitted into the slits 63. With this configuration, a configuration can be adopted in which the protrusion portions 64 of the second cover 17b abut against the side wall portions 24 and 25 of the case body 16 when the second cover 17b is attached at an improper position or in an improper orientation, and, as a result, it is possible to suppress erroneous attachment of the second cover 17b.

The present embodiment can be changed as follows and carried out. Any combination of the present embodiment and the following modified examples can be made as long as there is no technical contradiction.

A configuration may also be adopted in which the recess-protrusion relation between a first engaging portion 41 and a first engagement portion 31 is reversed, and the first engaging portion 41 having a protruding shape is engaged with the first engagement portion 31 having a recessed shape. A configuration may also be adopted in which the recess-protrusion relation between a second engaging portion 42 and a second engagement portion 32 is reversed, and the second engaging portion 42 having a protruding shape is engaged with the second engagement portion 32 having a recessed shape. A configuration may also be adopted in which the recess-protrusion relation between a third engaging portion 43 and a third engagement portion 33 is reversed, and the third engaging portion 43 having a protruding shape is engaged with the third engagement portion 33 having a recessed shape. A configuration may also be adopted in which the recess-protrusion relation between a fourth engaging portion 51 and a fourth engagement portion 34 is reversed, and the fourth engaging portion 51 having a protruding shape is engaged with the fourth engagement portion 34 having a recessed shape.

The number of case bodies in the case 12 is not limited to the above embodiment, and may be one, two, or four or more in accordance with the size in the longitudinal direction X of the secondary battery BT or the like.

In the case 12 according to the above embodiment, the covers 17 that cover the wire insertion portions 18 are composed of total six first and second covers 17a and 17b, but the number of covers is not limited to that in the embodiment, and may be changed as appropriate in accordance with the size in the longitudinal direction X of the secondary battery BT or the like.

In the above embodiment, a configuration is adopted in which electric wires 11 are routed along the longitudinal direction X of the case 12 that lies along the direction in which the battery cells C are provided in parallel, but, instead, for example, a configuration may also be adopted in which electric wires 11 are routed along the width direction Y of the case 12.

LIST OF REFERENCE NUMERALS

10 Battery wiring module
11 Electric wire
12 Case
13 Busbar
14 First wire lead-out portion
15 Second wire lead-out portion
16 Case body 17 Cover
17*a* First cover
17*b* Second cover
18 Wire insertion portion
19 Coupling portion
21 First case body
22 Second case body
23 Bottom wall portion
24 Side wall portion
25 Side wall portion
25*a* Opening
31 First engagement portion
31 Engagement portion
32 Second engagement portion
32 Engagement portion
33 Third engagement portion
33 Engagement portion
34 Fourth engagement portion
34 Engagement portion
40 Cover body portion
41 First engaging portion
41*a* Leading end portion
42 Second engaging portion
43 Third engaging portion
50 Cover body portion
51 Fourth engaging portion
61 First regulation portion (regulation portion)
62 Second regulation portion
63 Slit
64 Protrusion portion
BT Secondary battery
C Battery cell
L1 Length
L2 Length
L3 Length
L4 Length
L5 Length
X Longitudinal direction of case
Y Width direction of case
Z Height direction of case

What is claimed is:

1. A battery wiring module to be attached to a secondary battery, comprising: an electric wire to be electrically connected to the secondary battery; and a case that houses the electric wire, wherein the case includes a case body that has a wire insertion portion through which the electric wire is passed, and a cover that covers the wire insertion portion, the cover is formed separately from the case body, the case body includes a first engagement portion and a second engagement portion, the cover includes a cover body portion that covers the wire insertion portion, a first engaging portion that extends from the cover body portion to the case body side, and is engaged with the first engagement portion, and a second engaging portion that extends from the cover body portion to the case body side, and is engaged with the second engagement portion, a length in an extending direction of the first engaging portion is set longer than a length in an extending direction of the second engaging portion, and the case body includes a regulation portion that abuts against a leading end portion in the extending direction of the first engaging portion when the first engaging portion is about to be engaged with the second engagement portion, and regulates displacement of the first engaging portion in an attachment direction, wherein the wire insertion portion includes a bottom wall portion and a pair of side wall portions extending from the bottom wall portion, a slit is provided in the side wall portions, and the cover includes a protrusion portion fitted into the slit.

2. The battery wiring module according to claim 1, wherein the case body includes a third engagement portion, the cover includes a third engaging portion that extends from the cover body portion to the case body side, and is engaged with the third engagement portion, the length of the first engaging portion is set longer than a length of the third engaging portion in a direction that lies along an insertion direction of the electric wire, with the regulation portion being defined as a first regulation portion, the case body includes a second regulation portion on a lateral side of the third engagement portion in a direction that lies along the insertion direction of the electric wire, and when the first engaging portion is about to be engaged with the third engagement portion, the second regulation portion abuts against the first engaging portion, and regulates displacement of the first engaging portion in the attachment direction.

* * * * *